(12) United States Patent
Messely et al.

(10) Patent No.: US 10,768,682 B2
(45) Date of Patent: Sep. 8, 2020

(54) DETECTION-BASED WAKEUP OF DETECTION DEVICES

(71) Applicant: FLIR SYSTEMS, INC., Wilsonville, OR (US)

(72) Inventors: Pieter Messely, Ronse (BE); John H. Distelzweig, Santa Barbara, CA (US); Ian Johnston, Irvine, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 275 days.

(21) Appl. No.: 15/866,304

(22) Filed: Jan. 9, 2018

(65) Prior Publication Data

US 2018/0210536 A1    Jul. 26, 2018

Related U.S. Application Data

(60) Provisional application No. 62/448,858, filed on Jan. 20, 2017.

(51) Int. Cl.
| | |
|---|---|
| *G06F 3/16* | (2006.01) |
| *G10L 15/08* | (2006.01) |
| *G06F 1/3231* | (2019.01) |

(52) U.S. Cl.
CPC ............ *G06F 1/3231* (2013.01); *G06F 3/167* (2013.01); *G10L 15/08* (2013.01)

(58) Field of Classification Search
None
See application file for complete search history.

(56) References Cited

U.S. PATENT DOCUMENTS

| | | | |
|---|---|---|---|
| 8,456,515 B2 * | 6/2013 | Li | H04N 5/2257 348/42 |
| 8,469,272 B2 | 6/2013 | Kearney | |
| 9,348,141 B2 * | 5/2016 | Bar-Zeev | G06T 15/20 |
| 10,032,276 B1 * | 7/2018 | Liu | G06T 7/246 |
| 10,043,076 B1 * | 8/2018 | Zhang | G06K 9/4671 |
| 10,402,663 B1 * | 9/2019 | Tsai | G02B 27/0172 |

(Continued)

OTHER PUBLICATIONS

Zhao et al., "EMD-Based Symbolic Dynamic Analysis for the Recognition of Human and Nonhuman Pyroelectric Infrared Signals," Sensors, Jan. 20, 2016, 14 Pages, vol. 16, Issue 126, Basel, Switzerland.

*Primary Examiner* — Reza Aghevli
(74) *Attorney, Agent, or Firm* — Haynes and Boone, LLP

(57) ABSTRACT

Techniques are disclosed for detection-based wakeup of detection devices. A method may include generating a mapping that includes entries. Each entry may associate a respective detection result of a first detection device with a respective detection result of a second detection device. The method may further include transitioning the second detection device to a first power mode upon completing the generating. The method may further include determining, by the first detection device, that a first object of a first object type is detected based on the mapping. The method may further include transitioning the second detection device out of the first power mode when the first object of the first object type is determined to be detected. The method may further include performing, by the second detection device, at least one action based on the first object. Related systems and devices are also disclosed.

20 Claims, 8 Drawing Sheets

(56) References Cited

U.S. PATENT DOCUMENTS

| | | | |
|---|---|---|---|
| 2010/0045869 A1* | 2/2010 | Baseley | G06T 7/73 348/598 |
| 2011/0237331 A1* | 9/2011 | Doucet | A63F 13/10 463/32 |
| 2011/0317809 A1* | 12/2011 | Eguchi | A61B 6/566 378/62 |
| 2012/0086729 A1* | 4/2012 | Baseley | G06T 19/006 345/633 |
| 2012/0108332 A1* | 5/2012 | Baseley | A63F 13/213 463/31 |
| 2014/0042319 A1* | 2/2014 | Pickett | H04N 5/33 250/330 |
| 2014/0347478 A1* | 11/2014 | Cho | G08B 13/19656 348/143 |
| 2015/0070498 A1* | 3/2015 | Kriel | B60R 11/04 348/148 |
| 2015/0199847 A1* | 7/2015 | Johnson | G09G 5/377 345/633 |
| 2015/0324656 A1* | 11/2015 | Marks | G01J 5/0025 383/103 |
| 2015/0369730 A1* | 12/2015 | Schmidt | H04N 5/332 250/208.1 |
| 2015/0379361 A1* | 12/2015 | Boulanger | H04N 5/33 701/2 |
| 2016/0091370 A1* | 3/2016 | Schnaare | G01M 99/00 702/183 |
| 2016/0098619 A1* | 4/2016 | Gaidon | G06K 9/6212 382/159 |
| 2016/0176338 A1* | 6/2016 | Husted | B60Q 9/008 340/435 |
| 2016/0196653 A1* | 7/2016 | Grant | H04N 5/2258 382/294 |
| 2016/0271795 A1* | 9/2016 | Vicenti | G05D 1/0274 |
| 2017/0004377 A1* | 1/2017 | Kim | G06T 7/543 |
| 2017/0010623 A1* | 1/2017 | Tang | H04N 5/247 |
| 2017/0061663 A1* | 3/2017 | Johnson | G06T 5/50 |
| 2017/0344833 A1* | 11/2017 | Ahlberg | G06K 9/00771 |
| 2017/0374296 A1* | 12/2017 | Schmidt | G01J 5/025 |
| 2018/0054573 A1* | 2/2018 | Handley | G01J 5/0859 |
| 2018/0089534 A1* | 3/2018 | Ye | G06K 9/2018 |
| 2019/0122369 A1* | 4/2019 | Jung | G06T 7/11 |
| 2019/0162439 A1* | 5/2019 | Tsuda | A61B 5/7275 |

* cited by examiner

DETECTION-BASED WAKEUP OF DETECTION DEVICES

CROSS-REFERENCE TO RELATED APPLICATIONS

This application claims the benefit of and priority to U.S. Provisional Patent Application No. 62/448,858 filed Jan. 20, 2017 and entitled "DETECTION-BASED WAKEUP OF DETECTION DEVICES," which is incorporated herein by reference in its entirety.

TECHNICAL FIELD

One or more embodiments relate generally to detection devices and more particularly, for example, to detection-based wakeup of detection devices.

BACKGROUND

Detection systems, such as thermal imaging systems and visible light imaging systems, are often used to detect objects in various situations. A detection system may include a single detection device or a network of detection devices. For example, in the latter case, the detection system may be a surveillance system for a building, with detection devices (e.g., surveillance cameras) of different fields of view detecting for objects (e.g., humans, fires, smoke) within the building and along an outside perimeter of the building. The surveillance system may contact, or cause to be contacted, appropriate emergency responders, such as a police department, fire department, medical/paramedic services, and so forth, based on the types of objects detected.

In some cases, the detection devices that form the detection system may be associated with varying levels of power consumption. For example, detection devices that perform more operations and/or more computationally intensive operations may be associated with, on average, higher power consumption than other detection devices. In cases where such detection devices are battery powered and/or not readily accessible to an external power source, the higher average power consumption may reduce the efficacy of the detection system, since, for example, the detection devices associated with higher power consumption may need to be accessed and/or taken offline in order to replace a battery or otherwise supply power to the detection devices.

It would therefore be desirable to provide improved detection systems.

SUMMARY

In one or more embodiments, a method includes generating a mapping that includes entries. Each entry associates a respective detection result of a first detection device with a respective detection result of a second detection device. The method further includes transitioning the second detection device to a first power mode upon completing the generating. The method further includes determining, by the first detection device, that a first object of a first object type is detected based on the mapping. The method further includes transitioning the second detection device out of the first power mode when the first object of the first object type is determined to be detected. The method further includes performing, by the second detection device, at least one action based on the first object.

In one or more embodiments, a detection system includes a first detection device configured to generate detection results based on objects detected in a first detection region. The detection system further includes a second detection device configured to generate detection results based on objects detected in a second detection region, where the second detection region overlaps at least a portion of the first detection region. The detection system further includes a mapper device configured to generate a mapping that includes a first plurality of entries, where each of the first plurality of entries associates a respective detection result of the first detection device with a respective detection result of the second detection device. The second detection device is further configured to transition to a first power mode upon completion of generation of the mapping. The first detection device is further configured to determine that a first object of a first object type is detected based on the mapping. The second detection device is further configured to transition out of the first power mode when the first object of the first object type is determined to be detected. The second detection device is further configured to perform at least one action based on the first object.

In one or more embodiments, a detection device includes at least one processing circuit. The processing circuit is configured to determine that a first object of a first object type is detected based on a mapping. The mapping associates detection results of the device with classifications generated by a second detection device. The processing circuit is further configured to facilitate transition of the second detection device out of a lower power mode when the first object of the first object type is determined to be detected by the detection device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
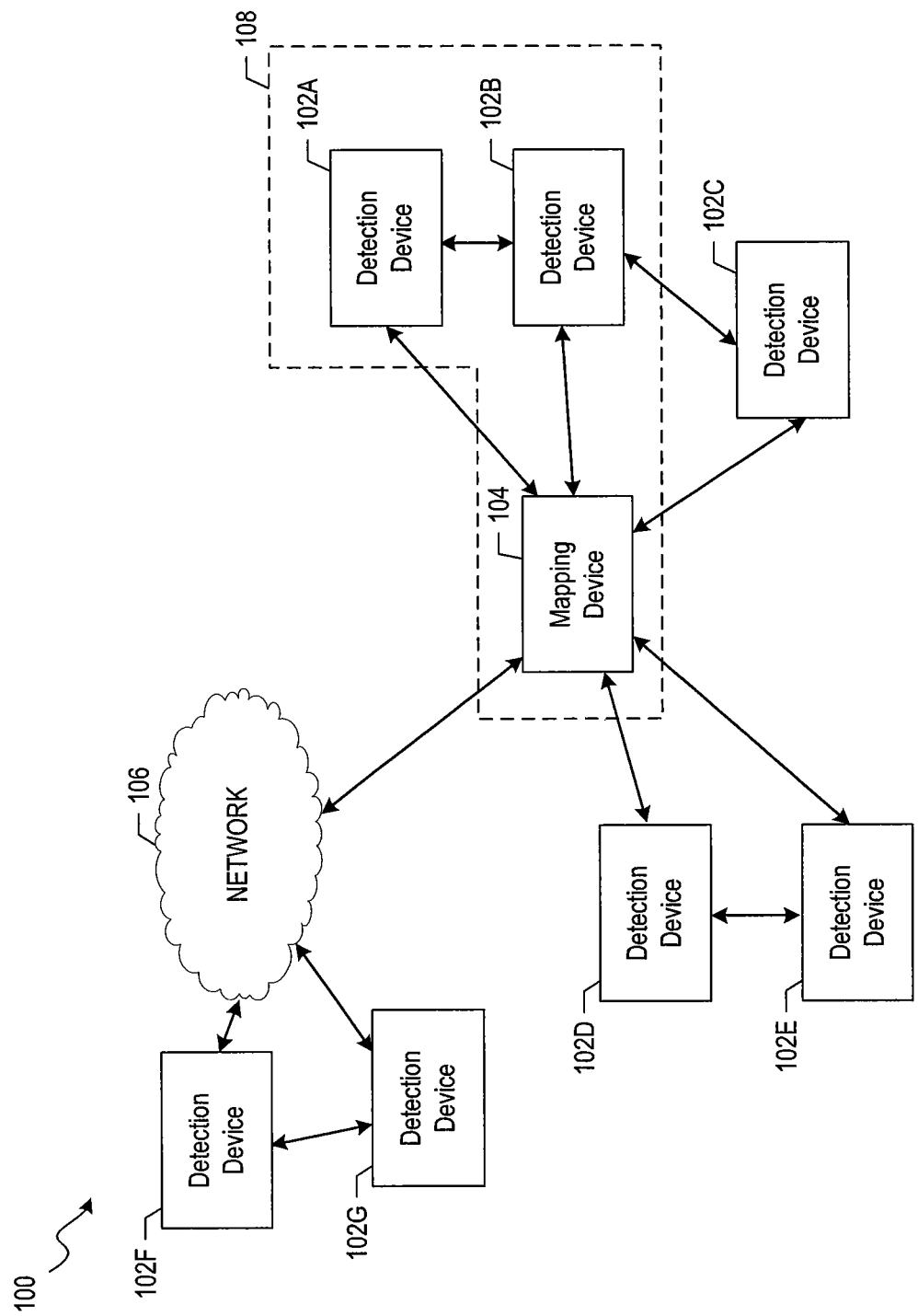
FIG. 1 illustrates an example network environment in which detection-based wakeup of detection devices may be implemented in accordance with one or more embodiments of the present disclosure.

Embodiments of the present disclosure and their advantages are best understood by referring to the detailed

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, the subject technology facilitates detection-based wakeup of detection devices. A detection system may include a first detection device, a second detection device, and a mapping device. The detection devices may capture a scene and generate detection results associated with the scene. In an aspect, a detection region of the first detection device encompasses a detection region of the second detection device. The mapping device may generate a mapping that associates detection results of the first detection device with the detection results of the second detection device. In an aspect, the detection results of the second detection device may include a classification of objects detected in the scene. For example, the first detection device may include an infrared sensor that can capture/measure infrared radiation in its field of view, and the second detection device may include a visible-light camera and classification capabilities. In an aspect, a training stage of the detection system may include operations associated with generating the mapping. In this regard, during the training stage, the second detection device can be considered to be training the first detection device to classify detected objects. The detection system may transition into a normal operating stage once the training stage is complete.

Once the generation of the mapping is complete, the second detection device may be transitioned to a lower power mode, while the first detection device may continue capturing the scene and generating detection results. Using the mapping generated by the mapping device, the first detection device may generate detection results and classify the detection results. When the first detection device detects objects of certain object types in the scene, the first detection device may wake up the second detection device. For instance, the first detection device may transmit a control signal (referred to herein as a wake up signal) to the second detection device that, when processed by the second detection device, causes the second detection device to transition out of the lower power mode. The second detection device may perform actions based on the detected object type.

In the lower power mode, the second detection device may be shut down or placed in a sleep mode. In an aspect, in the lower power mode, the second detection device does not perform operations associated with capturing a scene and generating detection results. For example, in the lower power mode, the components of the second detection device associated with capturing a scene and generating detection results may be shut down or placed in a sleep mode. The second detection device may conserve computational resources when in the lower power mode, which may facilitate reduction of power usage by the second detection device.

In some cases, in capturing a scene and generating detection results, the first detection device may be associated with lower power usage, on average, than the second detection device. For example, the classification capabilities of the second detection device may utilize object recognition technology, which is generally computationally intensive. In this regard, after the training stage, the first detection device may be utilized to coarsely classify objects detected in the detection region of the first detection device. When the first detection device detects objects of certain object types (e.g., using the mapping), the first detection device may wake up the second detection device, which may more accurately and/or finely classify the objects. In such a case, the first detection device and the second detection device may be referred to as a simple detection device and a complex detection device, respectively.

Although the foregoing description is with respect to a case in which the first detection device may be associated with lower power dissipation, on average, than the second detection device, in some cases, alternatively or in addition, the detection device that is transitioned into the lower power mode (e.g., after the training stage) may be the detection device with less battery capacity, less accessibility to an external power source (e.g., an electrical wall outlet), and/or other criteria.

FIG. 1 illustrates an example network environment 100 in which detection-based wakeup of detection devices may be implemented in accordance with one or more embodiments of the present disclosure. Not all of the depicted components may be required, however, and one or more embodiments may include additional components not shown in FIG. 1. Variations in the arrangement and type of the components may be made without departing from the spirit or scope of the claims as set forth herein. Additional, fewer, and/or different components may be provided.

The network environment 100 includes detection devices 102A-G, a mapping device 104, and a network 106. The detection devices 102A-G and mapping device 104 are capable of communicating with one or more other devices of the detection devices 102A-G and/or mapping device 104, e.g. via wired or wireless communication. In FIG. 1, the detection device 102A may communicate with the detection device 102F via the network 106 (e.g., a wireless network). The detection devices 102A-G and mapping device 104 may communicate using one or more wireless communication technologies, such as Wi-Fi (IEEE 802.11ac, 802.11ad, etc.), cellular (3G, 4G, 5G, etc.), Bluetooth™, etc. and/or one or more wired communication technologies. The network 106 may include a local area network (LAN), a wide area network (WAN), an Intranet, or a network of networks (e.g., the Internet).

The connections (e.g., wired, wireless) shown in FIG. 1 between the detection devices 102A-G and mapping device 104 are provided by way of non-limiting example. In some cases, the connections may include intra-chip, inter-chip (e.g., within the same device or between different devices), and/or inter-device connections. For example, although the detection devices 102A-G and mapping device 104 are depicted in FIG. 1 as separate devices connected (e.g., wire connected, wirelessly connected) to other devices and with their own enclosures (e.g., represented as rectangles), in some cases the devices 102A-G and/or 104 may be integrated on the same integrated circuit and/or enclosed in a common housing. For example, the detection devices 102A-B may be connected via intra-chip connections (e.g., traces). Additional, fewer, and/or different connections may be provided.

The detection devices 102A-G can be any device capable of detecting objects and generating detection results based on the detected objects. The detection devices 102A-G may include one or more of a thermal sensor, a visual sensor (e.g., visible-light camera or video camera), a radar-based sensor, a sonar-based sensor, a passive sensor, an active sensor, a barometer, a smoke detector, a gas detector, a pressure sensor, a radiation monitor, and/or other detectors. The detection devices 102A-G may generate detection results for objects that fall within their respective detection regions.

For example, the detection region of a passive infrared (PIR) sensor may be a field of view of the PIR sensor, with the PIR sensor measuring IR radiation within its field of view. As another example, the detection region of a laser may be a path (e.g., a linear path) through which the laser propagates, with objects being detected by the laser when any portion of the objects crosses the laser's path (e.g., breaks the path of the laser). In some cases, one of more of the detection devices 102A-G may have classification capabilities for classifying the detected objects, e.g. determining an object type for each detected object.

The mapping device 104 generates a mapping between detection results from pairs of the detection devices 102A-G. For example, the mapping device 104 may receive a detection result from the detection device 102A and a corresponding detection result from the detection device 102B.

As one example, the detection device 102A may include an IR detector (e.g., PIR detector, active IR detector) that measures IR radiation measured in its field of view and generates a signal (e.g., a voltage) based on the measured IR radiation, and the detection device 102B may include a visible light camera that captures visible light images in the field of view of the visible light camera and a classification circuit that can detect/identify and classify objects in the visible light images (e.g., using object recognition technology). In such an example, the detection result of the detection device 102A is the generated signal, and the detection result of the detection device 102B is the classification of any detected objects.

As another example, the detection device 102C may include a single laser device that can be used to detect an object if the object disrupts a laser beam. In such a case, the detection result of the detection device 102C may be a binary signal, e.g. signal set to 0 to indicate no object has been detected and 1 to indicate that an object has been detected. In another case, the detection device 102C may include multiple lasers (e.g., set at varying heights and/or directed at various angles) that can be used to detect a height and/or shape of an object based on which of the lasers are disrupted. In a case with three lasers, for example, the detection result of the detection device 102C may be a signal that indicates whether an object is detected (e.g., if any one of the three lasers is disrupted) and whether the object is tall (e.g., if all three lasers are disrupted simultaneously), short (e.g., if only one laser is disrupted), of medium height (e.g., if two lasers are disrupted simultaneously). Other laser systems in which fewer, more, and/or different lasers may be utilized. The orientation of each laser may be set to facilitate accurate detection of objects.

In an embodiment, the mapping device 104 may generate a mapping between detection results from pairs of the detection devices 102A-G other than the detection devices 102A and 102B. For example, the mapping device 104 may generate a mapping between detection results of the detection device 102B and the detection device 102C. In this regard, a detection result (e.g., height and/or shape of the object as determined by a laser device) of the detection device 102C may be associated with a corresponding detection result (e.g., a classification) of the detection device 102B. In this regard, the mapping device 104 may generate a mapping for pairs of detection devices in which, at some time or in some time duration, the detection region of one of the detection devices encompasses the detection region of another of the detection devices. In this manner, an object detected by one of the pair of detection devices is generally within the detection region of the other of the pair of detection devices.

In some cases, the detection regions of one or more of the detection devices 102A-G may be tunable. For example, the detection device 102B may include a camera with pan-tilt-zoom (PTZ) capability, such that its field of view may be adjusted based on application. As an example application, the detection devices 102A-C may be utilized as surveillance cameras in a parking lot. The detection devices 102A and 102C may include cameras with a fixed field of view, whereas the detection device 102B may include a camera with PTZ capability. For instance, the detection devices 102A-C may be mounted on the same pole. The detection devices 102A-C may be positioned such that the detection device 102B is capable of tuning its field of view to encompass (e.g., completely overlap) the field of view of the detection device 102A, the field of view of the detection device 102C, and/or other fields of view that only partially overlaps or do not overlap the field of view of the detection devices 102A and/or 102C.

In an embodiment, the mapping may be included in a mapping file. For a mapping file generated for the detection devices 102A and 102B, the mapping file may include entries, where each entry associates a detection result of the detection device 102A with a corresponding detection result of the detection device 102B. For example, a detection result of the detection device 102B may be a PIR signal of a scene generated based on a measured IR radiation and a detection result of the detection device 102B may be a classification of an object detected in the scene by the detection device 102A as a "bird". The mapping device 104 may generate a different mapping file for each pair of detection devices 102A-G. In this regard, the mapping file generated by associating the detection results of the detection devices 102A and 102B is generally different from the mapping file generated by associating the detection results of the detection devices 102D and 102G. As another example, the mapping file generated by associating the detection results of the detection devices 102A and 102B is generally different from the mapping file generated by associating the detection results of the detection devices 102B and 102C.

In some embodiments, to facilitate association between the detection results from the detection device 102A and the detection results from the detection device 102B, the extent (e.g., size, location) of the detection results within the detection regions of the detection devices 102A-B and/or the time or time range associated with the detection results may be utilized. For example, the detection devices 102A-B may associate each of their detection results with associated location and/or time information and provide such information to the mapping device 104 for use in generating the mapping.

The detection devices 102A-B may be synchronized to the same clock (e.g., at least for purposes of the capturing the scene and generating detection results). The detection devices 102A-B may generate a timestamp for each detection result and provide the detection results and associated timestamps to the mapping device 104. A detection result of the detection device 102B that has a timestamp that is the same or substantially the same as a timestamp of a detection result of the detection device 102A may be referred to as a corresponding detection result. In this regard, based on the timestamps, the mapping device 104 can associate detection results from the detection device 102A with corresponding detection results from the detection device 102B.

In some cases, the devices 102A, 102B, and/or 104 may have an agreed upon parameters (e.g., timing, packet format) by which to send/receive detection results. The parameters may be determined as part of an association procedure, handshake procedure, calibration procedure, initial setup procedure, or any other procedure associated with setting up the devices 102A-B and 104. Such a procedure may be automated and/or manual (e.g., initialed and/or controlled by an operator). In this regard, any offset in the detection region, clock, location information, and/or other characteristics associated with scene capture by the detection devices 102A-B may be determined and accounted for, such as during a calibration procedure.

In an embodiment, the detection devices 102A-B and mapping device 104 may form, or may form a part of, a detection system 108. In some cases, the detection system 108 may include, or may be coupled to, a central controller device (not shown). The detection system 108 may be, or may be a part of, a surveillance system of a building. For example, the detection device 102A and other detection devices (not shown) may include PIR sensors with different fields of view, and the detection device 102B may include classification capabilities and an adjustable field of view that can be tuned to encompass the field of view of the detection devices 102A and the other detection devices. In some cases, the mapping device 104 may be utilized by multiple detection systems.

Although the network environment 100 shows a single mapping device, additional mapping devices may be included in the network environment 100, such as to work in parallel with the mapping device 104 and/or to serve as backup in the case that the mapping device 104 is unable to generate the mapping files (e.g., the mapping device 104 is taken offline for maintenance). In some cases, different mapping devices may be designated for generating mapping files for different pairs of detection devices. In some cases, the mapping device 104 may also include a detector(s). For example, the mapping device 104 may generate a mapping for associating its own detection results with detection results of one or more of the detection devices 102A-G.

In an embodiment, the network environment 100 may include a controller device (e.g., a central controller device) that can coordinate the detection devices 102A-G, mapping device 104, and/or other detection devices and/or mapping devices not shown in FIG. 1. For instance, the controller device may generate a clock signal that can be used by the detection devices 102A-G and mapping device 104, e.g. for purposes of capturing scenes, generating detection results, and/or generating mapping files. In some cases, the controller device may be a part of one or more of the detection devices 102A-G and/or mapping device 104. In other cases, the controller device may be a separate device from the detection devices 102A-G and mapping device 104.

In one or more embodiments, one or more of the detection devices 102A-G may have capability transition to a lower power mode. In an aspect, in the lower power mode, the detection device is not utilized to capture a scene and generate detection results. The lower power mode of the detection device may include a sleep mode, shutdown mode, or generally any power mode that consumes less power than in a power mode (e.g., normal power mode, higher power mode) in which the detection device is utilized to capture a scene, generate detection results, communicate detection results to the mapping device 104, and/or other operations associated with capturing/processing the scene. For example, when a detection device is in the shutdown mode, the detection device may turn off components associated with capturing/processing the scene. In the sleep mode, the detection device may place the components associated with capturing/processing the scene in a sleep state such that the wakeup time of these components is shorter compared to turning off these components in the shutdown mode. In some cases, the difference in latency between the latency for transitioning the detection device out of the sleep mode and latency for transitioning the detection device out of the shutdown mode may be negligible.

In some embodiments, one or more of the detection devices 102A-G may generate and transmit control signals to others of the detection devices 102A-G to wake up the recipient(s) of the control signals. In an aspect, such control signals may be referred to as wakeup signals. The detection device 102A may generate and transmit a wake up signal to the detection device 102B when the detection device 102A determines that an object(s) of a certain object type(s) detected in the detection region of the detection device 102A warrants waking up the detection device 102B.

In one or more embodiments, the detection system 108 may be operated in a training stage or a normal operation stage. During the training stage, the detection device 102A-B may capture a scene and generate detection results associated with the scene, and the mapping device 104 may generate a mapping associating the detection results of the detection devices 102A-B. In an aspect, the detection results from the detection device 102B may be classifications of detected objects. In this regard, the detection device 102B can be considered to be training the detection device 102A to classify detected objects based on the detection results of the detection device 102A and the corresponding classifications generated by the detection device 102B.

Once the generation of the mapping is complete, the detection system 108 may transition from the training stage to the normal operating stage. The detection device 102B may be transitioned to a lower power mode, while the detection device 102A may continue capturing the scene and generating detection results. Using the mapping generated by the mapping device, the detection device 102A may generate detection results and classify the detection results. When the detection device 102A detects objects in the scene of certain object types, the detection device 102A may wake up the detection device 102B. The detection device 102B may perform actions based on the detected object type. In some cases, the detection system 108 may transition back to the learning stage if the detection system 108 and/or component thereof are moved to a different location, and/or when instructed to transition back to the learning stage (e.g., by a manufacturer or user of the detection system 108).

In some cases, the detection device 102A may be associated with lower power consumption but coarser detection (e.g., classification) capability than the detection device 102B (e.g., subsequent to the training stage). For example, the detection device 102A may be a PIR signal that may be able to differentiate between a human being and a nonhuman animal, but not differentiate between different human beings, whereas the detection device 102B may be able to differentiate between different human beings (e.g., using facial recognition technology). The detection device 102B provides finer classification when needed (e.g., when woken up by the detection device 102A). Otherwise, the detection device 102B may conserve power by remaining in the lower power mode.

Figure 2:
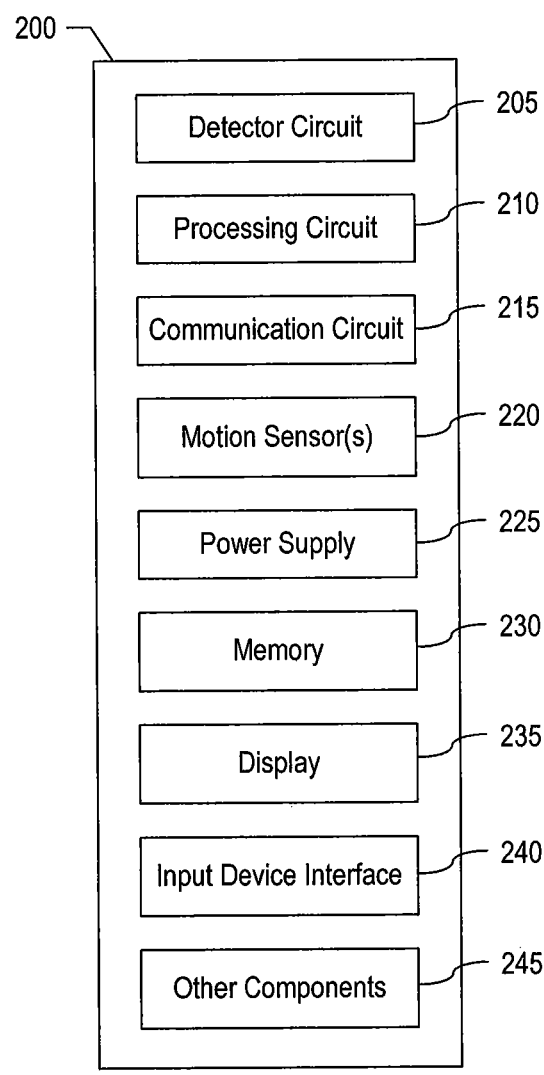
FIG. 2 illustrates a block diagram of an example device in accordance with one or more embodiments of the present disclosure.

FIG. 2 illustrates a block diagram of an example device 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

In an embodiment, the device 200 may be any one or the detection devices 102A-G, mapping device 104, and/or other device (e.g., controller device, detection device, mapping device). In this regard, the detection devices 102A-G, the mapping device 104, and/or other device may include additional components, different components, and/or fewer components than those shown in the device 200 of FIG. 2. For explanatory purposes, the description of FIG. 2 is with reference to the device 200 being a detection device (e.g., one of the detection devices 102A-G), although the description generally applies to a mapping device, controller device, or other device. Examples of differences and other description are provided in the case that the device 200 is a mapping device, controller device, or other device.

The device 200 includes a detector circuit 205, processing circuit 210, communication circuit 215, motion sensor(s) 220, power supply 225, memory 230, display 235, input device interface 240, and/or other components 245. The detector circuit 205 may be configured to capture scenes (e.g., capture information associated with the scenes). The captured scene and/or associated information may be based on the operation of the detector circuit 205. The detection devices 102A-G may include one or more of a thermal sensor, a visual sensor (e.g., visible-light camera or video camera), a radar-based sensor, a sonar-based sensor, a passive sensor, an active sensor, a barometer, a smoke detector, a gas detector, a pressure sensor, a radiation monitor, and/or other detectors.

For example, the detector circuit 205 may include a thermal sensor formed of a focal plane array (FPA) of microbolometers. The microbolometers may detect IR radiation in a scene in the form of heat energy and generate pixel values based on the amount of heat energy detected. As another example, the detector circuit 205 may include a visible-light camera that can capture the scenes as a visible-light image.

As another example, the detector circuit 205 may include an active sensor. The active sensor may include a sensor with a transmitter for emitting radiation and a receiver for receiving at least a portion of the emitted radiation. In an aspect, the emitted radiation and the received radiation may include electromagnetic (EM) radiation, acoustic radiation, and/or other radiation. For instance, an active sensor may be referred to as an active IR sensor when the emitted radiation and received radiation are IR radiation.

In some cases, an active sensor may include a break beam sensor, a reflectance sensor, and/or other sensor. A break beam sensor may include a transmitter for transmitting EM radiation, such as in a laser beam (e.g., IR laser beam, visible-light laser beam), and a receiver for receiving at least a portion of the EM radiation. For example, the transmitter may be a laser device pointed to the receiver. The EM radiation received by the receiver when only a background scene is present may be used as a baseline for detecting objects. An object may be detected when the EM radiation received by the receiver deviates from the baseline, which generally occurs when the object obstructs a signal path between the transmitter and the receiver. In an aspect, the amount of deviation between the baseline and the EM radiation received in the presence of the object may be used to classify the object. In some cases, the break beam sensor may determine characteristics of the object, such as shape, edges, and/or posture, which may be utilized to classify the object. The detection region of the break beam sensor may include the path of the laser.

A reflectance sensor may include a transmitter for emitting EM radiation and a receiver for receiving feedback EM radiation associated with the emitted EM radiation. The feedback EM radiation received by the receiver when only a background scene is present may be used as a baseline for detecting objects. An object may be detected when the object reflects the emitted EM radiation, which generally occurs when the object falls within the detection region of the reflectance sensor. The reflected EM radiation serves as the feedback EM radiation associated with the emitted EM radiation. The detection region of the reflectance sensor may include a region within which reflections resulting from detected objects may be received by the receiver with sufficient signal power. In this regard, objects that fall outside of the detection region may be associated with EM radiation that is too low to be used for reliable detection.

The processing circuit 210 may be configured to process the captured scene and generate detection results based on the captured scene. In this regard, the processing circuit 210 may process the captured scene to detect objects in the scene and may generate detection results based on the detected objects. For example, in the case of the detector circuit 205 being a beam break circuit, the detection result may be an indication (e.g., a binary signal) of whether or not an object is detected. In some cases, the detection result may indicate physical properties (e.g., size, shape, location) of the detected object. In some cases, the processing circuit 210 may detect and/or classify objects (e.g., in a captured image or video) using object recognition technology (e.g., facial recognition technology). The processing circuit 210 may also be configured to generate statistics associated with the detection and/or classification of objects, such as the number of each type of detected object, number of correct classifications, frequency of correctly or incorrectly classifying certain object types, and/or other statistics that may be utilized to facilitate reliable detection and/or classification of objects. In the case that the device 200 is the mapping device 104, the processing circuit 210 may be configured to generate a mapping based on detection results received from detection devices (e.g., the detection devices 102A-G). The device 200 may (but need not) include the detector circuit 205.

The communication circuit 215 may be configured to handle, manage, or otherwise facilitate wired and/or wireless communication between various components of the device 200 and between the device 200 and another device. As an example, the device 200 may be any one of the detection devices 102A-G and may transmit its detection results to the mapping device 104 and receive a mapping file from the mapping device 104. As another example, the device 200 may be the mapping device 104 of FIG. 1 and may receive detection results from other devices (e.g., the detection devices 102A and 102B) and transmit a mapping file to these other devices.

In an embodiment, the communication circuit 215 may include a wireless communication circuit (e.g., based on the IEEE 802.11 standard, Bluetooth™ standard, ZigBee™ standard, or other wireless communication standard), cellular circuit, or other appropriate communication circuit. In some cases, the communication circuit 215 may be configured for a proprietary wireless communication protocol and interface. The communication circuit 215 may include, or may be in communication with, an antenna for wireless communication. Thus, in one embodiment, the communication circuit 215 may handle, manage, or otherwise facilitate wireless communication by establishing a wireless link to a handheld device, base station, wireless router, hub, or other wireless networking device.

The communication circuit 215 may be configured to interface with, a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 215 may support proprietary wired communication protocols and interfaces. The communication circuit 215 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The motion sensor(s) 220 may be implemented by one or more accelerometers, gyroscopes, and/or other appropriate devices that may be used to detect movement of the device 200. In an embodiment, information provided by the motion sensor(s) 220 may facilitate operations (e.g., object detection) performed by the processing circuit 210, such as by facilitating differentiation between motion of objects in the scene relative to motion of the device 200. In some cases, the motion sensor(s) 220 may be implemented as part of the device 200 and/or in other device(s) attached to or otherwise interfaced with the device 200.

The power supply 225 may supply power to operate the device 200, such as by supplying power the various components of the device 200. An amount of power supplied via the power supply 225 may be adjusted based on an operation mode of the device 200 (e.g., lower power mode, higher power mode). The power supply 225 may be, or may include, one or more batteries (e.g., rechargeable batteries, non-rechargeable batteries). The batteries may be a lithium ion battery, lithium polymer battery, nickel cadmium battery, nickel metal hydride battery, or any other battery suitable to supply power to operate the device 200. Alternatively or in addition, the power supply 225 may be, or may include, one or more solar cells. The solar cells may be utilized to supply power to operate the device 200 and/or to charge one or more rechargeable batteries.

The memory 230 may be utilized to store information for facilitating operation of the device 200. By way of non-limiting example, the memory 230 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 230 may include volatile memory, such as random-access memory (RAM), dynamic RAM (DRAM), static RAM (SRAM), etc. The memory 230 may store information such as instructions to be executed by the various components (e.g., the processing circuit 210) of the device 200, mapping file, templates for use in classifying objects, information associated with captured scenes, and/or other information.

The information associated with captured scenes may include PIR signals, visible-light images of the scenes, detection results (e.g., classification results), and/or other information. In various embodiments, information associated with captured scenes may be stored in the memory 230 and retrieved later for purposes of reviewing and/or further training the device 200 and/or another device. In some cases, the memory 230 may include a library of mapping files and/or templates that can be used to the device 200 and/or used by the device 200 to train other devices. The library may be updated to facilitate reliable detection and/or classification of objects. For example, updates may be based on field experience of the device 200 and/or other devices, and/or updates (e.g., software, hardware, and/or firmware updates) from a manufacturer, support services, and/or user of the device 200.

The display 235 (e.g., screen, touchscreen, monitor) may be used to display information associated with the captured scene, such as a graph of a PIR signal as a function of time, visible light images, detection results, and/or information (e.g., statistics associated with the detection results). In some cases, the display 235 may be utilized to display a prompt (e.g., "Please provide a classification for the circled object in the image.") to a user to request classification feedback from the user.

The input device interface 240 may allow a user (e.g., an operator of the device 200) to communicate information to the device 200. Input devices that may be used with the input device interface 240 may include, for example, alphanumeric keyboards and pointing devices. An input device may be included in the device 200 or otherwise connected to the device 200 via the input device interface 240. In some cases, the input device may be a virtual keyboard provided for display using the display 235. In some cases, the input device interface 240 may allow the device 200 to receive a user input in response to a prompt displayed to the user.

In addition, the device 200 may include other components 245. By way of non-limiting example, the other components 245 may be used to implement any features of the device 200 as may be desired for various applications (e.g., clock generators, temperature sensors, and/or other components). In some cases, the other components 245 may be utilized in capturing scenes, generating detection results, and/or generating mappings, such as clock generators to facilitate time synchronization of the device 200 with other devices. The other components 245 may include components of the device 200 unrelated to capturing/processing scenes.

Figure 3A:
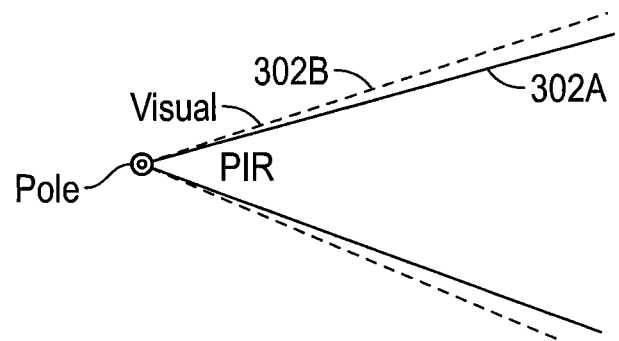
FIGS. 3A and 3B illustrate an example configuration of a pair of detection devices.
Figure 3B:
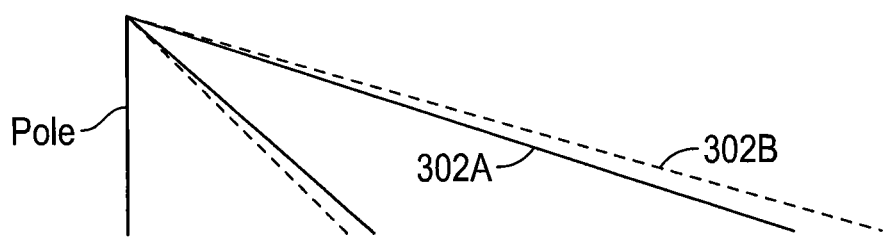

FIGS. 3A and 3B illustrate an example configuration of the detection devices 102A and 102B. In particular, FIGS. 3A and 3B illustrate a top view and a side view, respectively, of the configuration. The detection device 102A may be, may include, or may be a part of, a PIR detector that measures IR light radiating from a scene captured in its field of view and generates a signal (e.g., voltage signal) based on the measured IR light. The detection device 102B may be, may include, or may be a part of, a visible light camera that can capture images of a scene in its field of view. The detection device 102B may detect objects in the captured images and classify the detected objects.

The detection devices 102A and 102B are mounted to a pole at substantially the same location. The detection devices 102A and 102B may be contained in the same housing, or may be contained in separate housings. The detection device 102A has a field of view 302A and the detection device 102B has a field of view 302B. The field of view 302B of the detection device 102B encompasses the field of view 302A of the detection device 102A, such that any object that falls within field of view 302A also falls within the field of view 302B. In some cases, the fields of view 302A and 302B may be fixed. In other cases, the field of view 302A and/or 302B are not fixed. For example, the detection device 102A and/or 102B may have PTZ capability to allow tuning of its field of view.

It is noted that the configuration of FIGS. 3A and 3B is provided by way of non-limiting example, and that other configurations may be utilized. For example, the detection devices 102A-B may be suspended on different poles, at different elevations on the same pole, not suspended on poles, or other possible configurations that allow the detection region of the detection device 102A to be encompassed by the detection region of the detection device 102B, e.g. or more generally any configuration to allow objects detected by the detection device 102A to also be detected by the detection device 102B.

Figure 4:
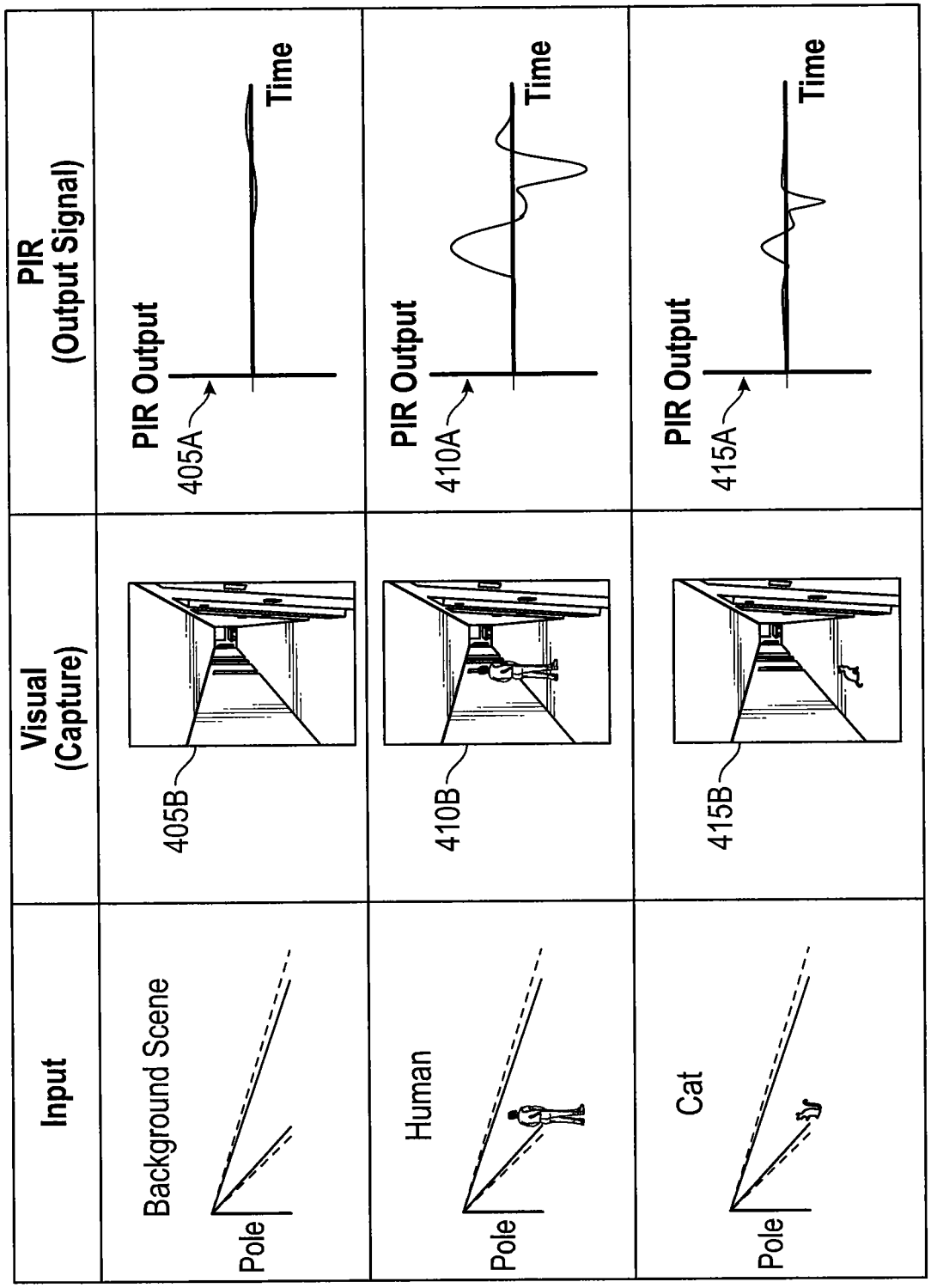
FIG. 4 illustrates examples of scenes captured by the pair of detection devices shown in FIGS. 3A and 3B.

FIG. 4 illustrates examples of scenes captured by the detection devices 102A and 102B. The detection devices 102A and 102B capture the scene encompassed by the fields of view 302A and 302B shown in FIGS. 3A and 3B. The detection device 102A may be, may include, or may be a part of, a PIR detector that measures IR light radiating in the scene and generates a signal based on the measured IR light. The detection device 102B may be, may include, or may be a part of, a visible light camera that can capture images of the scene. The detection device 102B may detect objects in the captured images and classify the detected objects.

In particular, FIG. 4 illustrates a visible image capture of a background scene, a scene with a human in the background scene, and a scene with a cat in the background scene, and associated PIR signals for each of these visual image captures. The detection device 102A may use a PIR graph 405A as its background scene and the detection device 1-02B may use a visible light image 405B as its background scene. The background scene may a baseline that the detection devices 102A-B can use to detect objects that move into and through the detection region of the detection devices 102A-B, such as in background subtraction approaches. For example, the background scene may be subtracted each scene captured by the detection device 102A, so that the captured scene is associated with a null (e.g., zero) detection result when only the background scene is present. In an embodiment, the detection devices 102A-B may detect objects based on deviations between a captured scene and the background scene. In some cases, the detection result of the detection device 102A may be based on a difference between the background scene and the scene in the presence the object.

For an object in the scene, the detection result from the detection device 102A may be the PIR graph (e.g., PIR output as a function of time) generated when the object moves into the field of view of the detection device 102A, and the detection result from the detection device 102B may be the classification of the object when the object moves into and/or through the field of view of the detection device 102A. The PIR output may be a voltage generated based on an IR signal measured by the detection device 102A. In FIG. 3, when a human enters the fields of view of the detection devices 102A-B, the detection result of the detection device 102A is a PIR graph 410A and the detection result of the detection device 102B is the classification (e.g., "human") of the object detected in a visible light image 410B. When a cat enters the fields of view of the detection devices 102A-B, the detection result of the detection device 102A is a PIR graph 415A and the detection result of the detection device 102B is the classification (e.g., "human") of the object detected in a visible light image 415B.

In some embodiments, the detection result from the detection device 102A and the corresponding detection result from the detection device 102B may be provided to the mapping device 104. The mapping device 104 can add an entry in the mapping file to associate the detection result from the detection device 102A and the corresponding detection result from the detection device 102B. For example, an entry may include the PIR graph 410A from the detection device 102A and the classification "human" from the detection device 102B, thus associating a human being detected with the PIR graph 410A. In this regard, for example, the PIR graph 410A may serve as a signature (e.g., an IR signature) of a "human", such that subsequent PIR output signals with characteristics similar to or same as the PIR graph 410A may be determined by the detection device 102A to be a human.

Similarly, a PIR graph 415A may serve as a signature. For example, in some cases, the detection device 102B may provide the classification "cat", whereas in others the detection device 102B may provide more general classifications such as "quadruped" or "nonhuman animal". The classification provided by the detection device 102B may be based on the object types that the detection device 102A may need to differentiate between based on application. For instance, when the detection system 108 is a surveillance system, the detection device 102B may teach the detection device 102A to classify object types into "human", "nonhuman animal", "fire", and/or "smoke". In this regard, although the detection device 102B may be capable of finer classification (e.g., differentiating between a "cat" and a "dog"), such fine-tuned classification may not be taught to the detection device 102A. In some cases, an object type may be associated with multiple signatures. For example, different PIR signals may all be classified as "human" by the detection device 102B. In such a case, multiple entries associating the "human" classification with different PIR signals may be included in the mapping file.

Figure 5:
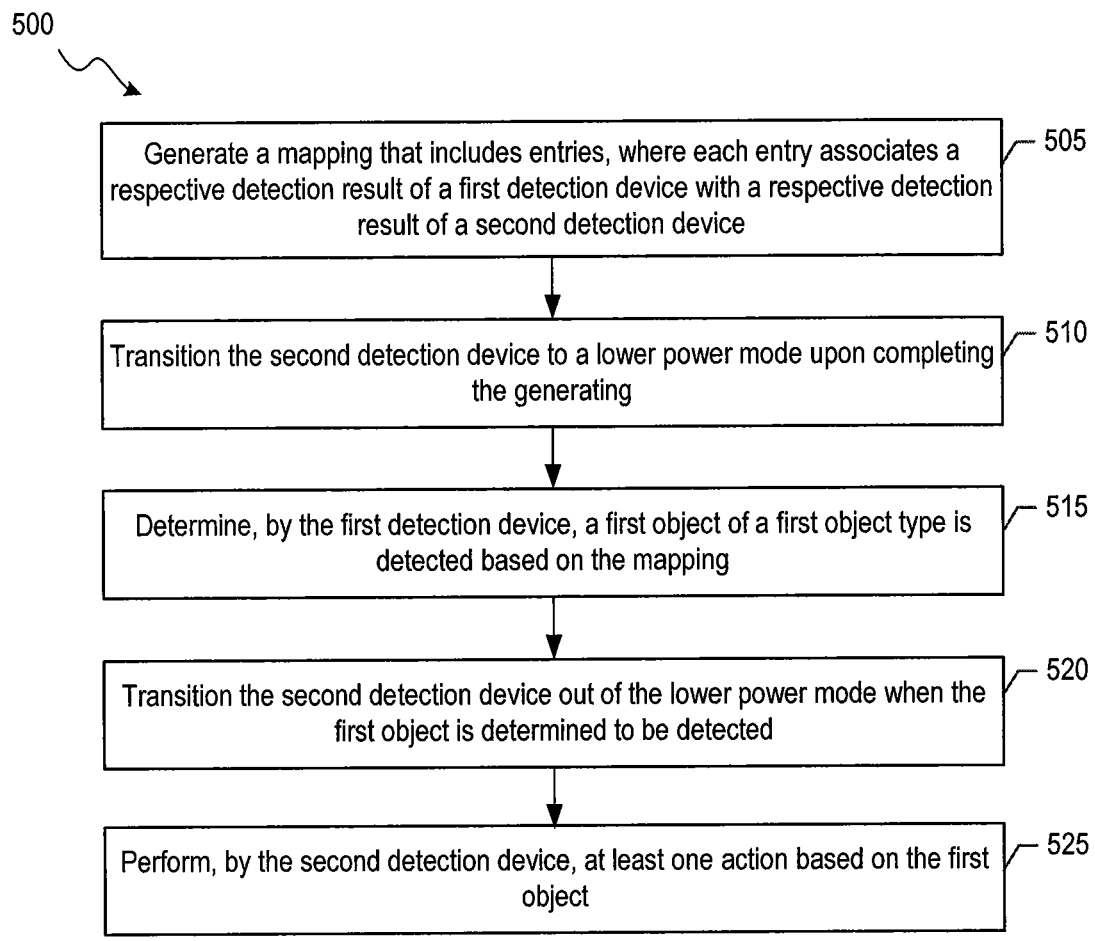
FIG. 5 illustrates a flow diagram of an example process for facilitating detection-based wakeup of detection devices in accordance with one or more embodiments of the present disclosure.

FIG. 5 illustrates a flow diagram of an example process 500 for facilitating detection-based wakeup of detection devices in accordance with one or more embodiments of the present disclosure. For explanatory purposes, the example process 500 is primarily described herein with reference to the detection devices 102A-B and mapping device 104 of FIG. 1; however, the example process 500 is not limited to the detection devices 102A-B and mapping device 104 of FIG. 1.

At block 505, the mapping device 104 generates a mapping that includes entries, where each entry associates a detection result of the detection device 102A with a detection result of the detection device 102B. In an aspect, each entry may be generated and added to a mapping file. The mapping file may be stored locally in the mapping device 104 and/or remotely at other devices, including the detection device 102A, detection device 102B, controller device, and/or other devices.

In an embodiment, the detection devices 102A-B may capture a scene (e.g., at/within substantially the same time range) and generate their respective detection result based on the captured scene. For example, the detection device 102A may capture the scene by measuring an IR radiation of the scene (e.g., using an active or passive sensor) and generate a detection result (e.g., a PIR graph) based on the measured IR radiation. The measured IR radiation may be, or may be processed to form, the detection result.

The detection device 102B may capture the scene by capturing a visible light image of the scene (e.g., using a visible-light camera), detecting objects in the visible light image, and classifying the detected objects. In some cases, the detection and/or classification may be performed using object recognition technology. For example, the detection device 102B may have access to a database (e.g., a library) containing templates with examples of characteristics (e.g., appearance) of different object types, with which the detected object can be compared. Features (e.g., edges, shape, posture, etc.) of the detected object may be compared with features of the objects and object types provided by the templates. Alternatively or in addition, the object recognition may include facial recognition for identifying specific people. For example, a user of the detection device 102B may provide images of specific people (e.g., user, friends/family of the user) that can be used to train the detection device 102B to identify and differentiate between these people. These images may be stored in the database. The database may be stored on memory (e.g., memory 230) local to the detection device 102B, and/or may be accessible to the detection device 102B on remote memory (e.g., memory of a controller device, an external memory connected to the detection device 102B, and/or memory of a remote server accessible to the detection device 102B).

In this example, the detection result of the detection device 102A may be the PIR graph and the detection result of the detection device 102B may be a classification of objects detected by the detection device 102B. Each entry of the mapping may map a PIR graph from the detection device 102A to a classification from the detection device 102B, and/or vice versa.

At block 510, when the generation of the mapping is complete, the detection device 102B transitions to a lower power mode. In an aspect, when the generation of the mapping is complete, the detection system 108 transitions from a training stage to a normal operation stage. The mapping device 104 may transmit the mapping (e.g., in the form of a mapping file) to the detection device 102A, e.g. for use during the normal operation stage. In some cases, the mapping device 104 may also be transmitted to the detection device 102B.

In an aspect, the mapping device 104 may transmit a control signal to the detection devices 102A and/or 102B that indicates that the generation of the mapping is complete (e.g., the learning stage can be ended). In some cases, the control signal from the mapping device 104 may indicate that the detection device 102B can transition to the lower power mode. In some cases, the control signal from the mapping device 104 may be, or may include, the mapping. In some cases, the mapping device 104 may transmit the control signal to the detection device 102A which, in turn, causes the detection device 102A to transmit a control signal to the detection device 102B that indicates the detection device 102B can transition to the lower power mode. In some cases, the control signal from the detection device 102B may be, or may include, the mapping.

In an aspect, in the lower power mode, the detection device 102B lowers resource usage (e.g., power usage) by not using resources to capture the scene and generate detection results. For example, to transition to the lower power mode, the detection device 102B may shut down, or place in a sleep mode, circuitry associated with capturing the scene and/or generating detection results. The latency associated with waking up shutdown circuitry is higher than the latency associated with circuitry placed in a sleep mode. In some cases, in the lower power mode, other circuitry may also be shut down or placed in a sleep mode in addition to the circuitry with capturing/processing scenes, such as the communication circuit (e.g., 215), motion sensor(s) (e.g., 220), and/or display (e.g., 235).

At block 515, the detection device 102A determines that an object of an object type is detected based on the mapping. The detection device 102A may generate a PIR graph as a detection result of the object when the object enters and/or moves within the field of view of the detection device 102A, and determine the object type of the object by comparing the generated PIR graph of the object with PIR graphs of the entries of the mapping.

In this regard, in an aspect, the detection device 102A may compare the generated PIR graph with the PIR graph in each entry of the mapping file by generating a difference between the generated PIR graph and the PIR graph of each entry, identifying an entry among all entries in the mapping file based on the generated differences, and determining the object type of the identified entry. The object type of the identified entry is the object type associated with the detected object. The difference may be sum of point-by-point magnitude differences between the generated PIR graph with the PIR graph of the entry in the mapping file, with the generated PIR graph and/or the PIR graph of the entry in the mapping file being extrapolated and/or interpolated as needed to facilitate such subtraction. The difference between the generated PIR graph and the PIR graph of the identified entry may be the minimum difference among the computed differences. In some cases, the detection device 102A may identify a ranked listing of entries based on the differences (e.g., top five entries associated with the smallest differences). The detection result may then be associated with any of the object type(s) associated with these entries. In an aspect, the identified entry may be considered a match when the difference between the generated PIR graph (e.g., the detection result) and the PIR graph of the entry in the mapping file is below a threshold value (e.g., a predetermined threshold value). In some cases, the threshold value may be set during setup of the detection system (e.g., the detection system 108).

In an aspect, the detection device 102A may compare the detection result with the entries of the mapping file associated with object types of interest prior to comparing the detection result with the remaining entries of the mapping file. In this regard, object types of interest may include those object types that, when detected, warrant transitioning the detection device 102B out of the lower power mode (e.g., waking up the detection device 102B). In some cases, the detection device 102A may stop comparing the detection result with the entries of the mapping file when an object type of interest is determined to be a match. In this regard, the detection device 102A may proceed to generate and transmit a wake up signal to the detection device 102B without processing the remaining entries of the mapping file, thus conserving resources (e.g., processing time and power). The object types that are of interest may be set during setup of the detection system (e.g., the detection system 108) and/or set/adjusted (e.g., automatically and/or manually) when the detection system is operating in the field, e.g.

based on field experience information, during the training stage and/or normal operation stage.

In an embodiment, the detection device 102A may have stored information (e.g., stored listing(s), stored decision matrix, stored lookup table), or may have access to information, that indicates object types that, when determined to be detected by the detection device 102A, causes the detection device 102A to generate and transmit a wake up signal to the detection device 102B, and object types that, when determined to be detected by the detection device 102A, does not cause the detection device 102A to generate and transmit a wake up signal. The stored information may be locally stored in the detection device 102A and/or remotely on one or more other devices (e.g., mapping device 104, controller device). In this regard, such information may be utilized by the detection device 102A to determine whether to wake up the detection device 102B upon detection of an object.

For example, with continued reference to the surveillance application, the detection device 102A may have a decision matrix indicating that, when objects classifiable as object types such as a "human", "smoke", and "fire" are determined to be detected, the detection device 102A generates and transmits a wake up signal to the detection device 102B. In an aspect, such object types may be referred to as being object types of interest to the detection devices 102A-B. In contrast, the decision matrix may indicate that, when objects of object types such as a "nonhuman animal" and/or "flying animal" are determined to be detected, the detection device 102A does not generate and transmit a wake up signal.

In some cases, when the detection device 102A detects an object that the detection device 102A is unable to match with any of the entries in the mapping file, the detection device 102A may process the object in accordance with a predetermined manner. For example, during an initial setup of a detection system including the detection devices 102A-B, the detection device 102A may be set to wake up the detection device 102B whenever the detection device 102A is unable to match a detected object with the entries in the mapping file. In contrast, the detection device 102A may be set not to wake up the detection device 102B whenever the detection device 102A is unable to match a detected object with the entries in the mapping file, e.g. since the detection device 102A is unable to match the detected object with any object types of interest. Other manners by which the detection device 102A may handle not being able to match a detection result with an entry of the mapping file may be utilized.

At block 520, the detection device 102B transitions out of the lower power mode when the object is determined to be detected. The detection device 102B may transition out of the lower power mode in response to receiving a control signal from the detection device 102A. For example, wake-on-LAN and/or wake-on-wireless-LAN technology may be utilized to transition the detection device 102A out of the shutdown state. Once transitioned out of the lower power mode, the detection device 102B may utilize resources to capture/process scenes and detect objects. In some cases, the wake up signal may be or may include an indication of the object type determined by the detection device 102B. In other cases, the wake up signal does not include the object type determined by the detection device 102B.

At block 525, the detection device 102B performs an action(s) based on the first object. The action(s) performed may be based on the object detected by the detection device 102A. In some cases, the detection device 102A may provide its classification of the first object to the detection device 102B, e.g. as part of and/or separate from the wake up signal.

As an initial action, the detection device 102B may determine (e.g., verify) the object type of the first object. In some cases, the detection device 102A may verify the object type of the first object using the object type determined by the detection device 102B as a basis. Using the object type determination from the detection device 102B may allow the detection device 102A to facilitate lower power consumption and/or optimize resource allocation (e.g., by narrowing down a search through possible object types).

For example, in a surveillance application, if the classification is successfully verified (e.g., the detection device 102B determines that the detection device 102A correctly classified the detected object), the detection device 102B may contact (e.g., generate an alarm to) the police department when the detected object type is a "human", may contact the police department and fire department when the detected object type is a "fire", and/or other actions based on the detected object type. In some cases, the detection devices 102A and/or 102B may transmit their detection results to the mapping device 104, and the mapping device 104 may update the mapping to include an entry associating the classification by the detection device 102B with the detection result from the detection device 102A, such that this entry may also be used as a basis in subsequent object detection/classification.

If the classification is not verified successfully, but the object type is still an object type of interest, the detection device 102B may perform the actions associated with the detected object type, as classified by the detection device 102B. In addition, the detection device 102B may transmit a signal to the detection device 102A to indicate to the detection device 102A the classification of the detected object by the detection device 102B. In some cases, the detection device 102A may accordingly adapt subsequent object detection/classification based on the signal from the detection device 102B. The detection devices 102A-B may provide the mapping device 104 with their detection results to allow the mapping device 104 to update the mapping.

If the classification is not verified successfully, and the object type is not an object type of interest, the detection device 102B may transmit a signal to the detection device 102A to indicate to the detection device 102A the classification of the detected object by the detection device 102B. The detection device 102B may also indicate to the detection device 102A to not wake up the detection device 102B upon subsequently detecting objects of such an object type. The detection device 102A may accordingly adapt subsequent object detection/classification based on the signal from the detection device 102B In some cases, when the detection device 102B confirms that an object type of interest is detected, the detection device 102B may contact a user prior to performing any further action, e.g. using one or more predetermined methods established during initial setup. For example, in the example surveillance system, the detection device 102B may transmit a short message service (SMS) text message and an email with an indication that an object of a particular object type is detected, an image of the detected object, and a prompt requesting the user for authorization to proceed with performing actions associated with the detected object type, such as requesting the user for authorization to contact the police department.

In some cases, when the user determines that the classification from the detection device 102B is correct, the user may handle the detected object himself/herself, and/or authorize the detection device 102B to proceed with performing the actions associated with the detected object type. When the user determines that the classification from the detection device 102B is not correct but the object type is of interest, the user may handle the detected object himself/herself, indicate the correct classification of the detected object to the detection device 102B, and/or indicate the correct classification and authorize the detection device 102B to proceed with performing the actions associated with the correct classification from the user. The detection devices 102A-B may adapt subsequent object detection/classification based on classification from the user. In an aspect, the mapping device 104 may add an entry to the mapping file associating the detection result of the object with the classification from the user.

While out of the lower power mode, the detection device 102B may capture the scene, generate detection results, and detect objects based on the detection results. For instance, the detection device 102B may detect other objects (e.g., aside from the objects that caused the wake up signal to be transmitted to the detection device 102B) and may perform actions based on the detected objects. In some cases, the detection device 102A may enter a lower power mode to conserve power, since the detection device 102B is handling detection in the field of view of the detection device 102A. In other cases, the detection device 102A may continue to capture the scene, generate detection results, and detect for objects in the scene.

The detection device 102B may transition to the lower power mode when no active events are present (e.g., no active events have been present for at least a predetermined amount of time), such as when no additional objects that warrant actions by the detection device 102B are detected and the objects that caused wake up of the detection device 102B have been addressed (e.g., a fire has been completely put out by the firefighters). In some cases, the detection device 102A may transmit a control signal periodically for the duration that the detection device 102B remains out of the lower power mode. In such cases, the detection device 102B may transition to the lower power mode when the detection device 102A is no longer sending the control signal.

Figure 6:
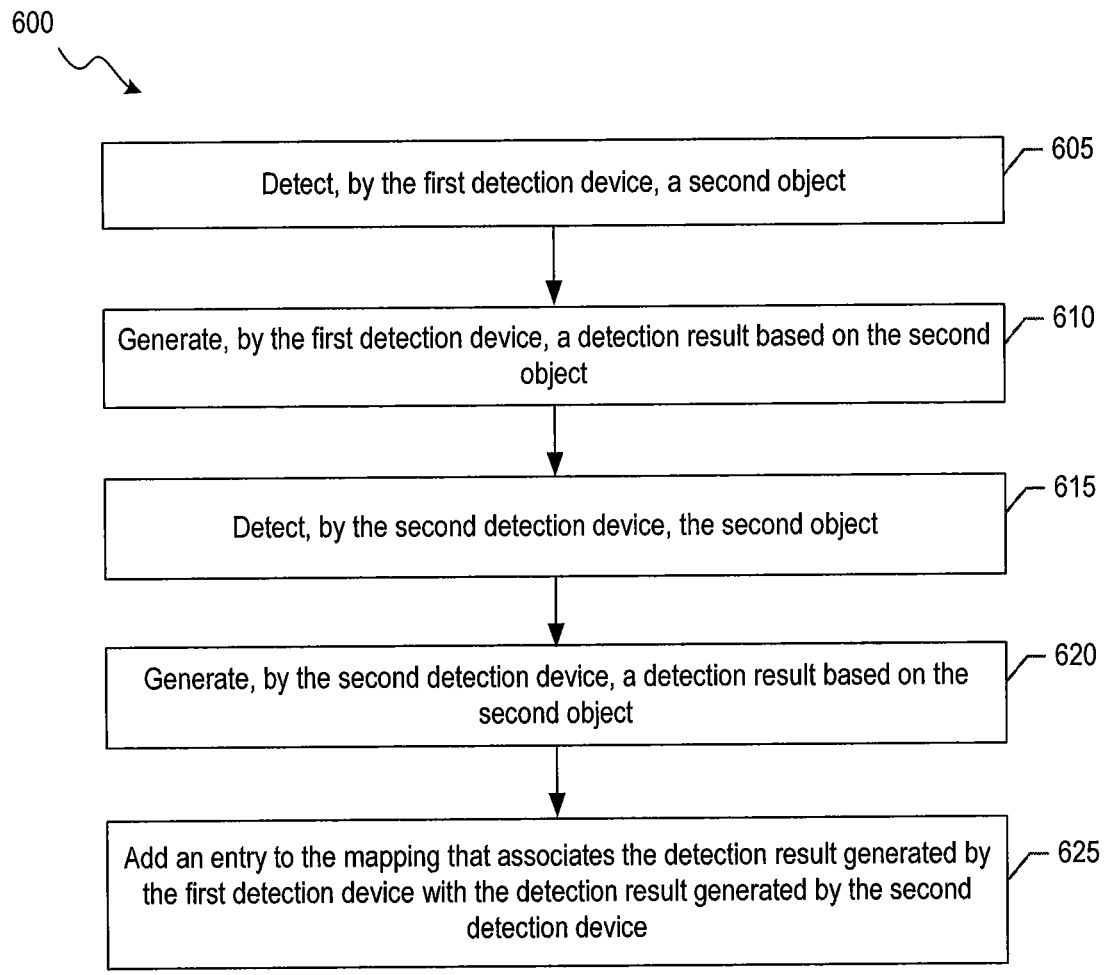
FIG. 6 illustrates a flow diagram of an example process for generating a mapping in accordance with one or more embodiments of the present disclosure.

FIG. 6 illustrates a flow diagram of an example process 600 for generating a mapping in accordance with one or more embodiments of the present disclosure. For explanatory purposes, the example process 600 is primarily described herein with reference to the detection devices 102A-B and mapping device 104 of FIG. 1; however, the example process 600 is not limited to the detection devices 102A-B and mapping device 104 of FIG. 1. The blocks of example process 600 are described herein as occurring in serial, or linearly (e.g., one after another). However, multiple blocks of example process 600 may occur in parallel. In addition, the blocks of example process 600 need not be performed in the order shown and/or one or more of the blocks of example process 600 need not be performed. In some aspects, the example process 600 may provide an example manner in which to perform the block 505 of FIG. 5.

At block 605, the detection device 102A detects an object. The detection device 102A may detect the object in a scene captured by the detection device 102A. At block 610, the detection device 102A generates a detection result based on the detected object. The detection result may be a PIR graph associated with the detected object.

At block 615, the detection device 102B detects the object. The detection device 102B may detect the object in a scene captured by the detection device 102B. At block 620, the detection device 102B generates a detection result based on the detected object. The detection result may be classification of the detected object.

In some cases, the detection devices 102A and 102B may capture the same scene at substantially the same time and may detect the object in the captured scene. In some cases, any time delay between the capture of the scene by the detection device 102A and by the detection device 102B may be accounted for (e.g., during a calibration procedure). As indicated previously, to facilitate generation of respective detection results of the detected object by both the detection device 102A-B, the detection devices 102A-B may be synchronized in time and the detection region (e.g., field of view) of the detection device 102B may encompass the detection region of the detection device 102A.

At block 625, the mapping device 104 adds an entry to a mapping file. The entry may include an association between the detection result generated by the detection device 102A and the detection result generated by the detection device 102B. For example, the entry may include the PIR graph from the detection device 102A and the corresponding classification from the detection device 102B. In this regard, to allow the mapping device 104 to add the entry, the detection devices 102A and 102B may transmit their respective detection results (e.g., with associated timestamps) to the mapping device 104.

In some aspects, the detection devices 102A-B transmit detection results to the mapping device 104 when the detection devices 102A-B detect objects in their respective field of view. When the mapping device 104 receives a detection result from one of the detection devices 102A or 102B but not the other detection device, the mapping device 104 may ignore the received detection result and move on, or may troubleshoot the situation. In some cases, the detection devices 102A-B and mapping device 104 may continue detecting and processing other objects while troubleshooting is occurring with respect to an object for which only one of the detection devices 102A-B provided a detection result.

For example, consider a case in which the mapping device 104 receives a detection result from the detection device 102B but not from the detection device 102A. When troubleshooting the situation, the mapping device 104 may request that the detection device 102A provide the mapping device 104 with information associated with the captured scenes over a range of time that encompasses the timestamp associated with the detection result from the detection device 102B. In one case, the mapping device 104 may successfully extract a detection result based on the information from the detection device 102A, in which case the mapping device 104 may generate an associated entry. In another case, the mapping device 104 may be unable to extract a detection result. In such a case, the mapping device 104 may ignore the received detection result from the detection device 102B and move on, may request troubleshooting of the detection device 102A (e.g., by a user and/or a manufacturer of the detection device 102A), and/or may request user input regarding how to handle the situation. In some cases, the actions performed by the mapping device 104 when the mapping device 104 receives a detection result from one of the detection devices 102A or 102B but not the other detection device may be set during setup of a detection system.

In some embodiments, the example process 600 may be performed for each object that is detected in scenes captured by the detection devices 102A and 102B when both the detection devices 102A and 102B are not in the lower power mode. For example, in an aspect, both the detection devices 102A-B are not in the lower power mode during a training stage and during a normal operation stage when the detection device 102B is woken up by a wake up signal.

Figure 7:
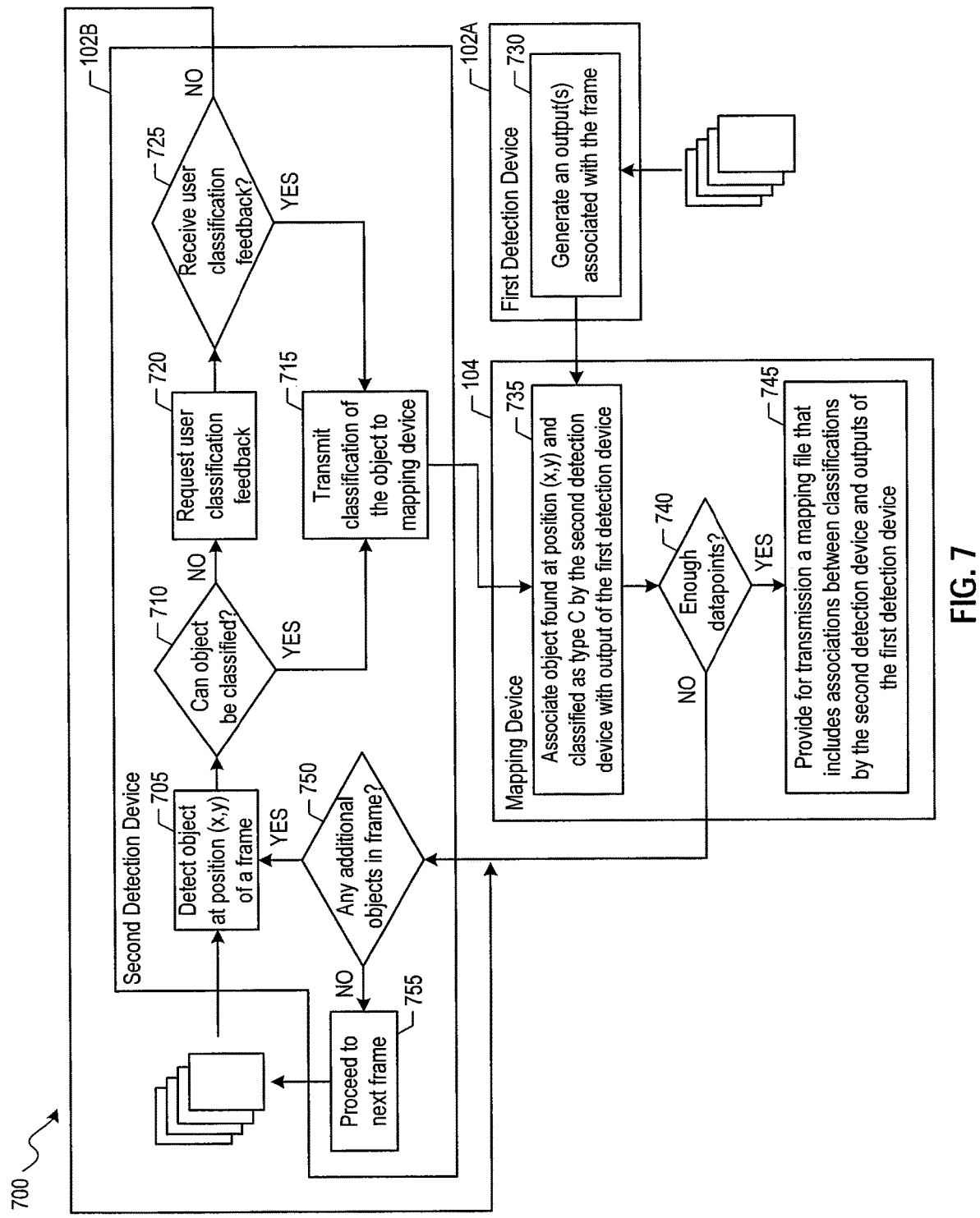
FIG. 7 illustrates a flow diagram of an example process for facilitating a training stage in accordance with one or more embodiments of the present disclosure.

FIG. 7 illustrates a flow diagram of an example process 700 for facilitating a training stage in accordance with one or more embodiments of the present disclosure. For explanatory purposes, the example process 700 is primarily described herein with reference to the detection devices 102A-B and mapping device 104 of FIG. 1; however, the example process 700 is not limited to the detection devices 102A-B and mapping device 104 of FIG. 1. The blocks of example process 700 are described herein as occurring in serial, or linearly (e.g., one after another). However, multiple blocks of the example process 700 may occur in parallel. In addition, the blocks of the example process 700 need not be performed in the order shown and/or one or more of the blocks of example process 700 need not be performed.

For explanatory purposes, with reference to FIG. 7, the detection device 102A includes a PIR sensor and the detection device 102B includes classification capabilities. The detection device 102B may be configured to transition to a lower power mode to conserve power and the detection device 102A being configured to generate/transmit control signals that cause the detection device 102B to wake up. In some embodiments, the example process 700 may be referred to as the training stage for the detection device 102A, in which the detection device 102B is utilized to teach the detection device 102A to classify objects.

At block 705, the detection device 102B detects an object at a pixel position (x, y) of a captured frame. In some cases, the detection device 102B may include a visible-light camera that can capture the frame. In other cases, the captured frame may be captured by another device (not shown) and provided to the detection device 102B for processing. At block 710, the detection device 102B determines whether the detected object can be classified by the detection device 102B. For example, the detection device 102B may perform object recognition to detect the object and/or classify the object. The detection device 102B may have access to a database containing templates with examples of what different object types look like, with which the detected object can be compared. Alternatively or in addition, the object recognition may include facial recognition for identifying specific people. The database may be stored on memory local to the detection device 102B, and/or may be accessible to the detection device 102B on remote memory.

In some cases, when the detection device 102B determines that the object is a human, the detection device 102B may determine whether the human matches a human in the database. In this regard, the user may include a white list and a black list. The user may specify actions to be performed based on the human that is identified. For example, the user may specify that the detection device 102B can transition back to the lower power mode when the human is identified as someone on the white list (e.g., the user himself/herself, family/friends of the user). In contrast, when the human is identified as someone on the black list, the detection device 102B may contact the police department. Humans that are on neither the white list nor the black list, or humans whose identity cannot be determined, may be considered as being on the black list. Other manners by which to employ facial recognition may be utilized.

If the detection device 102B is able to classify the detected object, the detection device 102B classifies the detected object and transmits the classification to the mapping device 104 at block 715. In some cases, the detection device 102B may associate a time or time range with the classification, such as by including a timestamp in a packet that also includes the classification.

If the detection device 102B is unable to classify the detected object, the detection device 102B requests classification feedback from a user (e.g., an operator of the detection device 102B) at block 720. In some cases, the detection device 102B may have, or may be communicatively coupled to, a display device (e.g., a screen, a monitor) that displays to the user a user interface. The user interface may be utilized to request user classification feedback. For example, the user interface may present the captured frame with a circle around the detected object and a prompt "Please provide a classification for the circled object in the frame. (Press Enter if you wish not to provide a classification.)" The user may respond to the prompt (e.g., via keyboard input) with the user's classification of the detected object or with no classification, e.g. pressing an Enter key in response to the prompt. The user may be presented with a request to classify the detected object and/or indicate whether the object is one of interest (e.g., an object that prompts waking up the detection device 102A). In one case, the classification provided by the user may be a new object type. In such a case, the detection device 102B may store information associated with this new object type, such that the detection device 102B is to classify subsequent detections of objects of the new object type as the new object type. In some cases, the user may be able to indicate to the detection device 102B that the detected object is in actuality multiple objects and the user may classify each object. For example, the user may be able to use a mouse to draw an outline around each individual object, and may provide a classification for each object. In these example manners, the classification capabilities of the detection device 102B are also trained during the training stage.

If the detection device 102B receives the user's classification, the detection device 102B transmits the user's classification of the detected object to the mapping device 104 at block 715. If the detection device 102B does not receive a classification from the user, the detection device 102B determines whether the frame contains other objects at block 750 and proceeds to process these other objects (if any) or proceed to a next frame at block 755.

In some cases, the detection device 102B does not store any information associated with a detected object for which the user does not provide classification feedback when requested. In other cases, the detection device 102B may identify the detected object as one of no interest, such that subsequent objects that are similar to the detected object can be classified as an object of no interest.

In some cases, the example process 700 might not include blocks 720 and 725. In these cases, when the detection device 102B is unable to classify the object, the detection device 102B may move on to processing a next object in the current image or proceed to a next image.

At block 730, the detection device 102A generates a PIR output (e.g., PIR graph) associated with the captured frame. The PIR output may be an IR output of a scene captured by the detection device 102A during a time duration that encompasses the time at which the frame is captured (e.g., by the detection device 102B), such that objects detected in the captured frame can be corresponded with objects detected in the PIR output. In some aspects, the detection devices 102A-B and/or mapping device 104 may be time synchronized such that the mapping device 104 is able to determine which object classification from the detection device 102B to associate with which PIR output from the detection device 102A.

At block 735, the mapping device 104 associates the object classification of the detected object (received from the detection device 102B) and the PIR output (received from the detection device 102A). In this regard, the PIR output and the object classification are detection results associated with the detected object of the detection devices 102A and 102B, respectively. In some aspects, the mapping device 104 may utilize timestamps to determine which object classification from the detection device 102B to associate with which PIR output from the detection device 102A.

At block 740, the mapping device 104 determines whether enough data points have been gathered. For example, the number of data points may be, or may be indicative of, the number of entries in the mapping file. In some cases, the mapping device 104 may determine that enough data points have been gathered when a sufficient number of entries have been created for each object type that the detection device 102A needs to learn prior to exiting the training stage. In this regard, in some cases, the detection devices 102A-B may exit the training stage only when the detection device 102B has trained the detection 102A to classify object types in the list. A list of object types that needs to be encountered/learned may be provided by a manufacturer and/or user of the detection device 102A, detection device 102B, and/or mapping device 104. For example, such a list of object types may be established during setup of an overall detection system (e.g., the detection system 108).

Alternatively or in addition, a duration of the training stage may be taken into consideration. For example, in some cases, when the duration of the training stage exceeds a predetermined threshold of time (e.g., one or more object types in the list are not being encountered), the detection device 102A, detection device 102B, and/or mapping device 104 may request that the user provide instructions on whether to continue in the training stage (e.g., beyond the predetermined threshold of time) or transition out of the training stage. In some cases, to accommodate the lower number of data points, the detection device 102A may be trained using a library, which may include previously generated mapping files and/or other previously obtained information that may facilitate classification of detected objects using PIR graphs. In this regard, the library may be used to interpolate missing data, such as data associated with objects that the detection device 102A did not encounter during the training stage. The library may be stored in the detection device 102B, mapping device 104, and/or other devices (e.g., controller device, remote server).

If the mapping device 104 determines that enough data points have been gathered, the mapping device 104 may provide for transmission (or otherwise allow access to) a mapping file that includes associations between the PIR outputs from the detection device 102A and the corresponding classifications by the detection device 102B at block 745. The completion of the mapping file may be indicative of an end of the training stage. For example, the mapping file may include entries, with each entry associating one classification result of the detection device 102B with a corresponding PIR output of the detection device 102A. In some cases, the mapping device 104 may transmit a control signal to the detection device 102A and/or the detection device 102B to indicate that no further data points are needed. In some cases, the control signal may be, or may include, the mapping file.

In some cases, the mapping device 104 may ignore any subsequent PIR outputs and/or classifications received from the detection devices 102A and 102B, respectively, after the mapping device 104 transmits the mapping file and/or the control signal. In other cases, the mapping device 104 may continue to process at least some subsequent classifications and PIR outputs after the mapping device 104 transmitted the control signal.

If the mapping device 104 determines that more data points are needed, the mapping device 104 allows the example process 700 to continue being performed. At block 750, the detection device 102B determines whether any additional objects are in the frame. If any additional objects are in the frame, the detection device 102B may perform blocks 705, 710, 715, 720, and/or 725 on a next object in the frame. If there are no additional objects in the frame, the detection device 102B proceeds to a next frame at block 755.

Although the blocks are shown as occurring in serial, the blocks may occur in parallel. For example, rather than performing blocks for one object at a time, the detection device 102B may perform the blocks on multiple objects in parallel. In some cases, during the training stage, the detection device 102A may be exposed to objects of all potential object types that may be encountered or at least to object types that need to be learned, such as from encountering the object types in the field or being provided with information about the object types (e.g., from a library).

Figure 8:
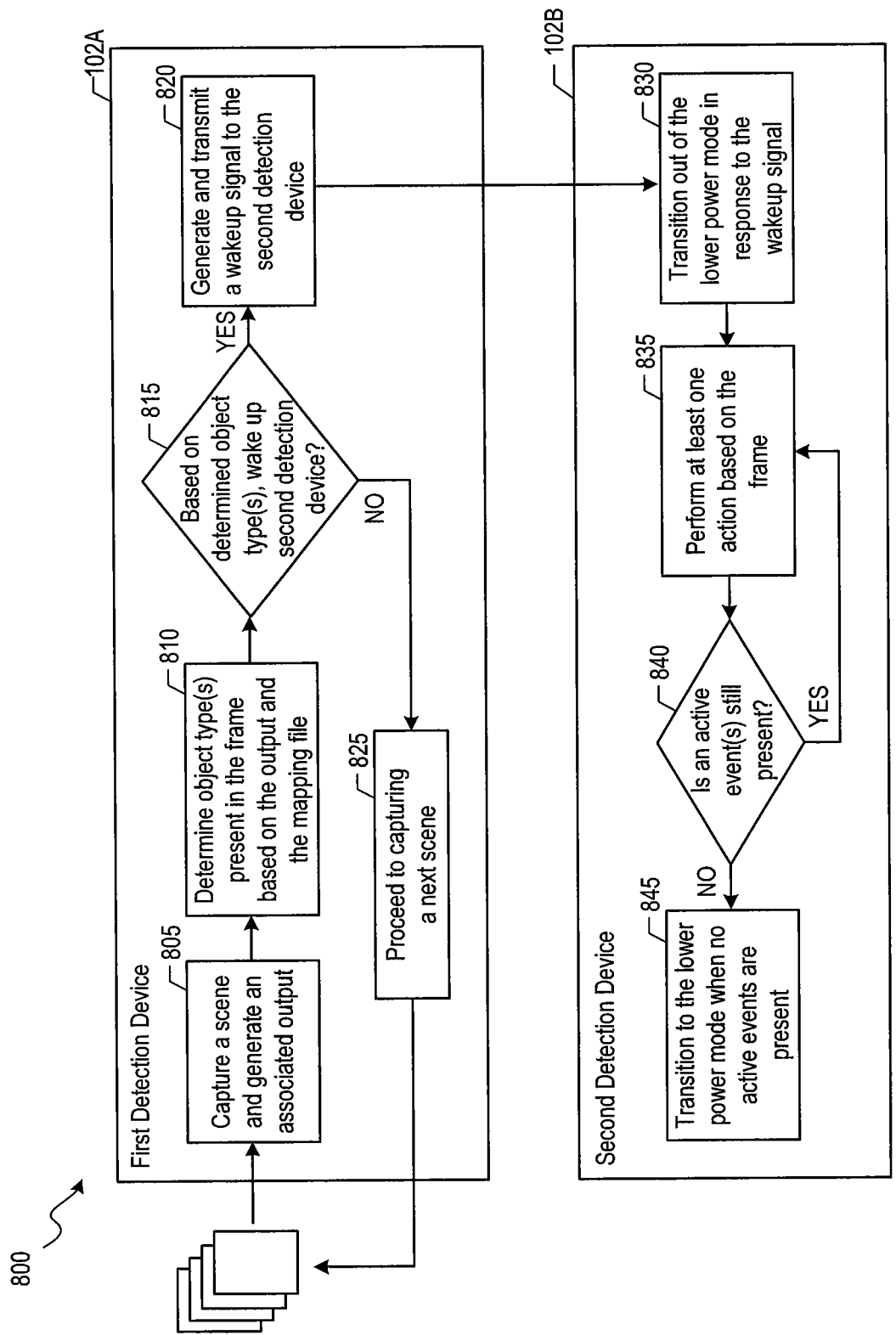
FIG. 8 illustrates a flow diagram of an example process for facilitating a normal operation stage in accordance with one or more embodiments of the present disclosure.

FIG. 8 illustrates a flow diagram of an example process 800 for facilitating a normal operation stage in accordance with one or more embodiments of the present disclosure. For explanatory purposes, the example process 800 is primarily described herein with reference to the detection devices 102A-B and mapping device 104 of FIG. 1; however, the example process 800 is not limited to the detection devices 102A-B and mapping device 104 of FIG. 1. The blocks of example process 800 are described herein as occurring in serial, or linearly (e.g., one after another). However, multiple blocks of the example process 800 may occur in parallel. In addition, the blocks of the example process 800 need not be performed in the order shown and/or one or more of the blocks of example process 800 need not be performed. In an embodiment, the example process 800 is performed after the example process 700, e.g. as part of a normal operation stage.

At block 805, the detection device 102A captures a scene and generates an associated output (e.g., PIR output). In some cases, the detection device 102A may continuously capture the scene. For example, the detection device 102A may determine, in real time or close to real time, whether object types are present in the scene. At block 810, the detection device 102A determines object type(s) that are present in the scene based on the generated output and the mapping file.

At block 815, the detection device 102A determines whether to wake up the detection device 102B based on the object type(s) determined to be present in the scene. For example, if any one of the object type(s) determined to be present in the scene indicates that the detection device 102B needs to be woken up, the detection device 102A makes the determination to wake up the detection device 102B. On the other hand, if none of the object type(s) determined to be present in the scene warrants needing to wake up the detection device 102B, the detection device 102A makes the determination to not wake up the detection device 102B.

If the detection device 102A determines that the detection device 102B needs to be woken up, the detection device 102A generates and transmits a control signal (e.g., a wakeup signal) to the detection device 102B at step 820. If the detection device 102A determines that the detection device 102B does not need to be woken up, the detection device 102A continues capturing the scene at step 825.

At block 830, the detection device 102B transitions out of the lower power mode in response to the wakeup signal (e.g., upon receiving and processing the wakeup signal). At block 835, the detection device 102B performs an action(s) based on the image. The specific action(s) performed are dependent on the application of the detection devices 102A and 102B. An initial action subsequent to waking up may involve verifying the object type(s) of the object(s) detected in the frame. Such an action may be present in many, if not most, applications. For example, in a surveillance application, upon successfully verifying one or more of the object type(s), the detection device 102B may contact (or cause to be contacted) a relevant authority, such as the police department if an unauthorized person (e.g., determined using facial recognition) is detected and/or the fire department if a fire is detected.

At block 840, the detection device 102B determines whether an active event(s) is still present. If the detection device 102B determines that an active event(s) is still present, the detection device 102B does not transition to the lower power mode. While out of the lower power mode, the detection device 102B may capture the scene, generate detection results, and detect objects based on the detection results. For instance, the detection device 102B may detect other objects (e.g., aside from the objects that caused the wake up signal to be transmitted to the detection device 102B) and may perform actions based on the detected objects.

At block 845, the detection device 102B transitions to the lower power mode when no active events are present, such as when no additional objects that warrant actions by the detection device 102B are detected and/or the objects that caused wake up of the detection device 102B have been addressed (e.g., a fire has been completely put out by the firefighters). For example, the detection device 102B may transition to the lower power mode when no active events have been present for a predetermined amount of time, which may be set during a setup of the detection system 108. In some cases, the detection device 102A may transmit a control signal periodically for the duration that the detection device 102B remains out of the lower power mode. In such cases, the detection device 102B may transition to the lower power mode when the detection device 102A is no longer sending the control signal to the detection device 102B.

According to embodiments, there is provided a machine-readable medium (e.g., computer-readable medium) on which is stored non-transitory information configured to control the components of the detection devices 102A-G, mapping device 104, device 200, and/or other devices, to perform any of the steps or functions described herein. According to embodiments, there is provided a computer program product comprising code portions adapted to control the components of the detection devices 102A-G, mapping device 104, device 200 to perform any of the steps or functions described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method, comprising:
generating a mapping that comprises a plurality of entries, wherein each of the plurality of entries associates a respective detection result of a first detection device with a respective detection result of a second detection device;
transitioning the second detection device to a first power mode upon completing the generating;
determining, by the first detection device, that a first object of a first object type is detected based on the mapping;
transitioning the second detection device out of the first power mode when the first object of the first object type is determined to be detected; and
performing, by the second detection device, at least one action based on the first object.

2. The method of claim 1, further comprising:
generating, by the first detection device, a signal when the first object of the first object type is determined to be detected; and
transmitting, by the first detection device, the signal to the second detection device,
wherein the second detection device transitions out of the first power mode in response to receiving the signal.

3. The method of claim 1, wherein the first detection device is associated with a first detection region, wherein the second detection device is associated with a second detection region that encompasses the first detection region, and wherein each detection result of the second detection device comprises a classification of an object detected by the second detection device.

4. The method of claim 1, wherein generating the mapping comprises, for each of the plurality of entries:
detecting, by the first detection device, a second object;
generating, by the first detection device, a detection result based on the second object;
detecting, by the second detection device, the second object;
generating, by the second detection device, a detection result based on the second object; and adding an entry to the mapping that associates the detection result generated by the first detection device with the detection result generated by the second detection device.

5. The method of claim 4, wherein the detection result generated by the second detection device is based on received user feedback indicative of a classification of the second object.

6. The method of claim 5, further comprising updating the mapping based on the received user feedback.

7. The method of claim 4, wherein the detection result generated by the first detection device comprises a voltage signal associated with the second object, and wherein the detection result generated by the second detection device comprises a classification of the second object.

8. The method of claim 1, further comprising:
transitioning the first detection device to the first power mode when the at least one action is completed,
wherein the at least one action comprises:
verifying the first object; and
generating an alarm when verification of the first object is successful.

9. The method of claim 1, wherein transitioning the second detection device to the first power mode comprises transitioning the second detection device from a second power mode to the first power mode, wherein the first power mode is associated with lower power usage than the second power mode, and wherein a detection region associated with at least one of the first detection device or the second detection device is tunable.

10. A detection system, comprising:
a first detection device configured to generate detection results based on objects detected in a first detection region;
a second detection device configured to generate detection results based on objects detected in a second detection region, wherein the second detection region overlaps at least a portion of the first detection region; and
a mapper device configured to generate a mapping that comprises a first plurality of entries, wherein each of the first plurality of entries associates a respective detection result of the first detection device with a respective detection result of the second detection device,
wherein the second detection device is further configured to transition to a first power mode upon completion of generation of the mapping,
wherein the first detection device is further configured to determine that a first object of a first object type is detected based on the mapping, and
wherein the second detection device is further configured to:
transition out of the first power mode when the first object of the first object type is determined to be detected; and
perform at least one action based on the first object.

11. The detection system of claim 10, wherein:
the first detection device is further configured to:
generate a wake up signal when the first object of the first object type is determined to be detected; and
transmit the wake up signal to the second detection device; and
the second detection device is configured to transition out of the first power mode in response to receiving the wake up signal.

12. The detection system of claim 10, wherein each detection result of the second detection device comprises a classification of an object detected by the second detection device.

13. The detection system of claim 10, wherein the mapping device is further configured to update the mapping based on the first object; and wherein the second detection device is configured to transition the second detection device to the first power mode from a second power mode, and wherein the first power mode is associated with lower power usage than the second power mode.

14. The detection system of claim 10, further comprising a third detection device configured to generate detection results based on objects detected in a third detection region, wherein the mapping comprises a second plurality of entries, and wherein each of the second plurality of entries associates a respective detection result of the second detection device and a respective detection result of the third detection device.

15. The detection system of claim 14, wherein:
the third detection device is further configured to determine that a second object of a second object type is detected based on the mapping,
the second detection device is further configured to:
transition out of the first power mode when the second object of the second object type is determined to be detected; and
perform at least one action based on the second object.

16. The detection system of claim 15, wherein the second detection device is configured to perform the at least one action based on the second object by:
adjusting the first detection region of the first detection device based on the third detection region of the third detection device;
verifying the second object; and
generating an alarm when verification of the second object is successful.

17. A detection device, comprising:
at least one processing circuit configured to:
while a second detection device is in a lower power mode, determine that a first object of a first object type is detected based on a mapping, wherein the mapping associates detection results of the detection device with classifications generated by the second detection device; and
facilitate transition of the second detection device out of the lower power mode when the first object of the first object type is determined to be detected by the detection device.

18. The detection device of claim 17, wherein the at least one processing circuit is configured to receive the mapping, wherein receipt of the mapping is indicative of the second detection device being transitioned into the lower power mode.

19. The detection device of claim 17, wherein the mapping comprises a plurality of entries, and wherein each of the plurality of entries associates a respective detection result of the detection device with a respective classification of the second detection device.

20. The detection device of claim 17, wherein the at least one processing circuit is configured to facilitate transition of the second detection device out of the lower power mode by transmitting a control signal to the second detection device.

* * * * *

UNITED STATES PATENT AND TRADEMARK OFFICE
CERTIFICATE OF CORRECTION

PATENT NO.         : 10,768,682 B2
APPLICATION NO.    : 15/866304
DATED              : September 8, 2020
INVENTOR(S)        : Pieter Messely, John H. Distelzweig and Ian Johnston Page 1 of 1

It is certified that error appears in the above-identified patent and that said Letters Patent is hereby corrected as shown below:

In the Specification

In Column 13, Line 44, change "1-02B" to --102B--

Signed and Sealed this
Seventeenth Day of November, 2020

Andrei Iancu
*Director of the United States Patent and Trademark Office*